US007769410B2

(12) United States Patent
Wang

(10) Patent No.: US 7,769,410 B2
(45) Date of Patent: Aug. 3, 2010

(54) MODULE STRUCTURE FOR EXPANDING AND ENHANCING FUNCTIONS OF A SIM CARD

(75) Inventor: Pen-Lo Wang, Longtan Township, Taoyuan County (TW)

(73) Assignee: A-Men Technology Corporation, Longtan Township, Taoyuan County (TW)

( * ) Notice: Subject to any disclaimer, the term of this patent is extended or adjusted under 35 U.S.C. 154(b) by 779 days.

(21) Appl. No.: 11/391,410

(22) Filed: Mar. 29, 2006

(65) Prior Publication Data

US 2007/0238485 A1    Oct. 11, 2007

(51) Int. Cl.
*H04B 1/38* (2006.01)
*H04M 1/00* (2006.01)
*H04M 11/00* (2006.01)

(52) U.S. Cl. .................... 455/558; 455/559; 455/557; 455/407

(58) Field of Classification Search ............... 455/558, 455/410, 411, 559, 557, 407
See application file for complete search history.

(56) References Cited

U.S. PATENT DOCUMENTS

| | | | | |
|---|---|---|---|---|
| 5,353,328 A * | 10/1994 | Jokimies | ............. | 455/558 |
| 5,778,322 A * | 7/1998 | Rydbeck | ............. | 455/558 |
| 5,887,266 A * | 3/1999 | Heinonen et al. | ............. | 455/558 |
| 5,933,785 A * | 8/1999 | Tayloe | ............. | 455/558 |
| 6,092,133 A * | 7/2000 | Erola et al. | ............. | 710/301 |
| 6,097,967 A * | 8/2000 | Hubbe et al. | ............. | 455/558 |
| 6,418,326 B1 * | 7/2002 | Heinonen et al. | ............. | 455/558 |
| 6,484,024 B1 * | 11/2002 | Darnault et al. | ............. | 455/418 |
| 6,603,982 B1 * | 8/2003 | Muller | ............. | 455/558 |
| 6,728,553 B1 * | 4/2004 | Lehmus et al. | ............. | 455/558 |
| 6,760,605 B1 * | 7/2004 | Vannel et al. | ............. | 455/558 |
| 6,766,177 B2 * | 7/2004 | Chambon et al. | ............. | 455/550.1 |
| 6,771,981 B1 * | 8/2004 | Zalewski et al. | ............. | 455/557 |
| 6,952,596 B2 * | 10/2005 | Dearn | ............. | 455/558 |
| 7,133,659 B2 * | 11/2006 | Zalewski et al. | ............. | 455/403 |
| 2004/0235523 A1 * | 11/2004 | Schrire et al. | ............. | 455/558 |
| 2006/0058065 A1 * | 3/2006 | Shen et al. | ............. | 455/558 |
| 2007/0232356 A1 * | 10/2007 | Wang | ............. | 455/558 |

* cited by examiner

*Primary Examiner*—Tilahun B Gesesse
(74) *Attorney, Agent, or Firm*—Muncy, Geissler, Olds & Lowe, PLLC

(57) ABSTRACT

A module structure for expanding and enhancing functions of a SIM card is composed of one or more than one slots and a control chip, wherein the slot is used for emplacing a subscriber identity card, and the control chip is installed with a new application interface and application service for providing a subscriber to operate. The control chip can proceed with a change of application interface and application service through a wireless transmission, a wired transmission, an external loading device, and other related techniques for loading data, so as to facilitate the subscriber to operate additional functions provided by the control chip, other than ordinary application services provided by a common subscriber identify card, thereby achieving purposes of expanding and enhancing the functions.

3 Claims, 9 Drawing Sheets

MODULE STRUCTURE FOR EXPANDING AND ENHANCING FUNCTIONS OF A SIM CARD

BACKGROUND OF THE INVENTION (a) Field of the Invention

The present invention relates to a module structure for expanding and enhancing functions of a SIM (Subscriber Identity Module) card, and more particularly to a module which is provided with an expansion effect and an enhancement function.

(b) Description of the Prior Art

Referring to FIG. 1 and FIG. 2, as the advancement of technology, a mobile phone A has become a necessity in a modern life, and more and more people has owned a variety of telecommunication line numbers to travel among different countries. Furthermore, in order to use different telecommunication line numbers, a subscriber needs to pull and insert a subscriber identity card A1 frequently, which is easy to cause a loose or even damage to a slot A2 of the mobile phone A. On the other hand, a subscriber identify module B in the current market can be only used to provide for an emplacement of limited subscriber identity cards A1; correspondingly, a choice of line numbers can be only switched by the emplaced subscriber identity card A1, which is still not able to achieve a function of switching among multiple line numbers.

Moreover, an additional function cannot be installed into the subscriber identity module B, according to a requirement of subscriber, and a storage capacity is limited and not able to be expanded when the subscriber is performing a data editing, modification, adding, sending a news-brief, and using a telephone directory, thereby causing an inconvenience in usage.

SUMMARY OF THE INVENTION

The primary object of the present invention is to provide a module structure for expanding and enhancing functions of a SIM card, which is provided with an expansion effect and an enhancement function, and enables a subscriber to choose among a variety of functions, according to his or her personal preferences, thereby changing a function of application service and application interface in a control chip, to facilitate an operation of the subscriber.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

The present invention is to provide a module structure for expanding and enhancing functions of a SIM card, whereby its functions can be expanded and its applications can be increased.

Figure 1:
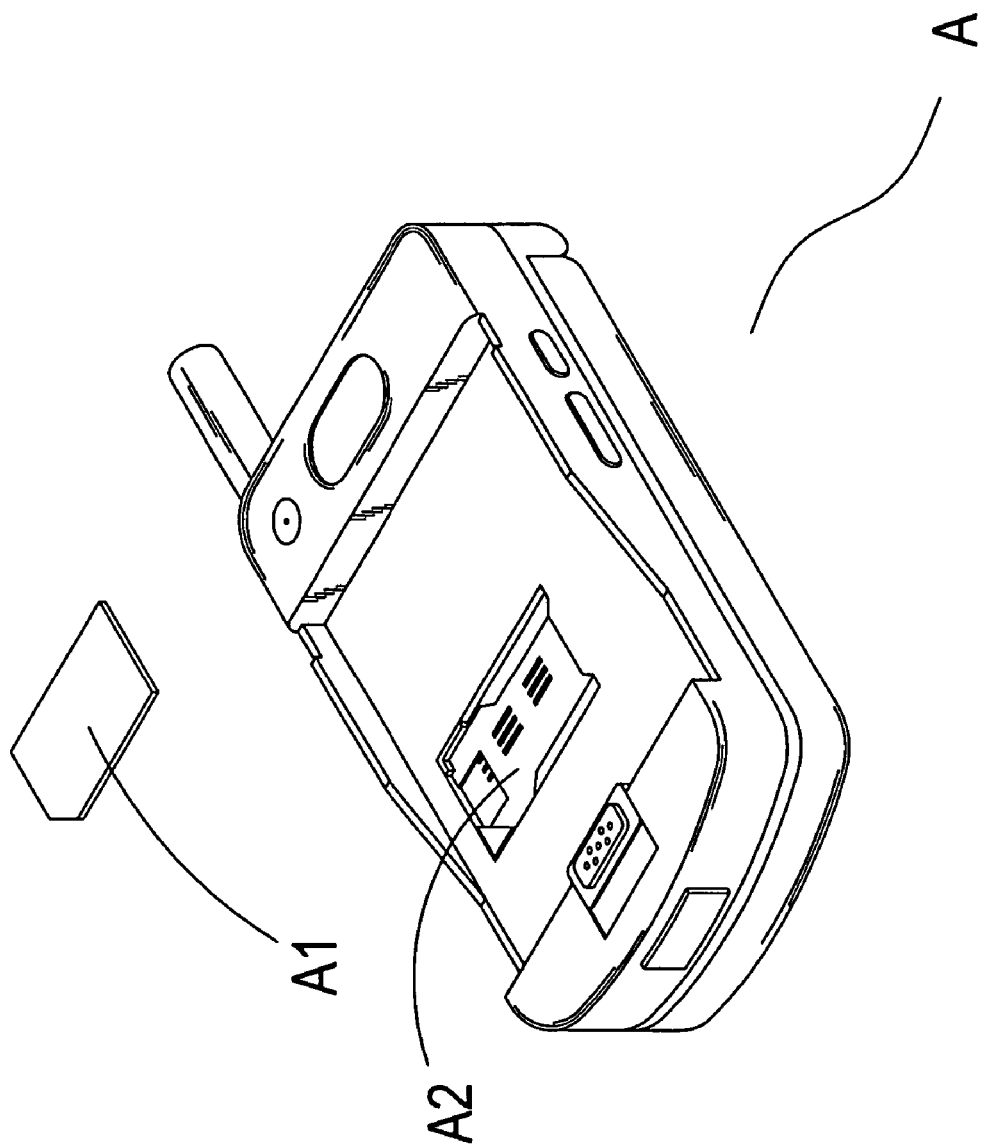
FIG. 1 shows a schematic view of an embodiment of a conventional application.
Figure 2:
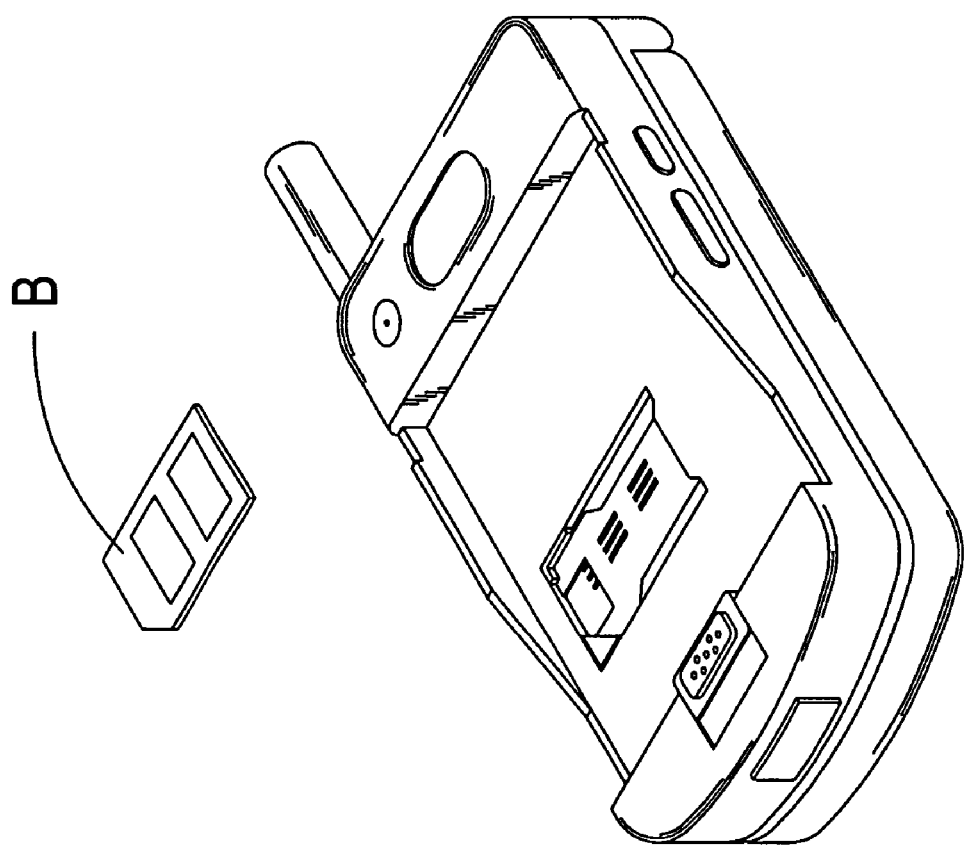
FIG. 2 shows another schematic view of an embodiment of a conventional application.
Figure 3:
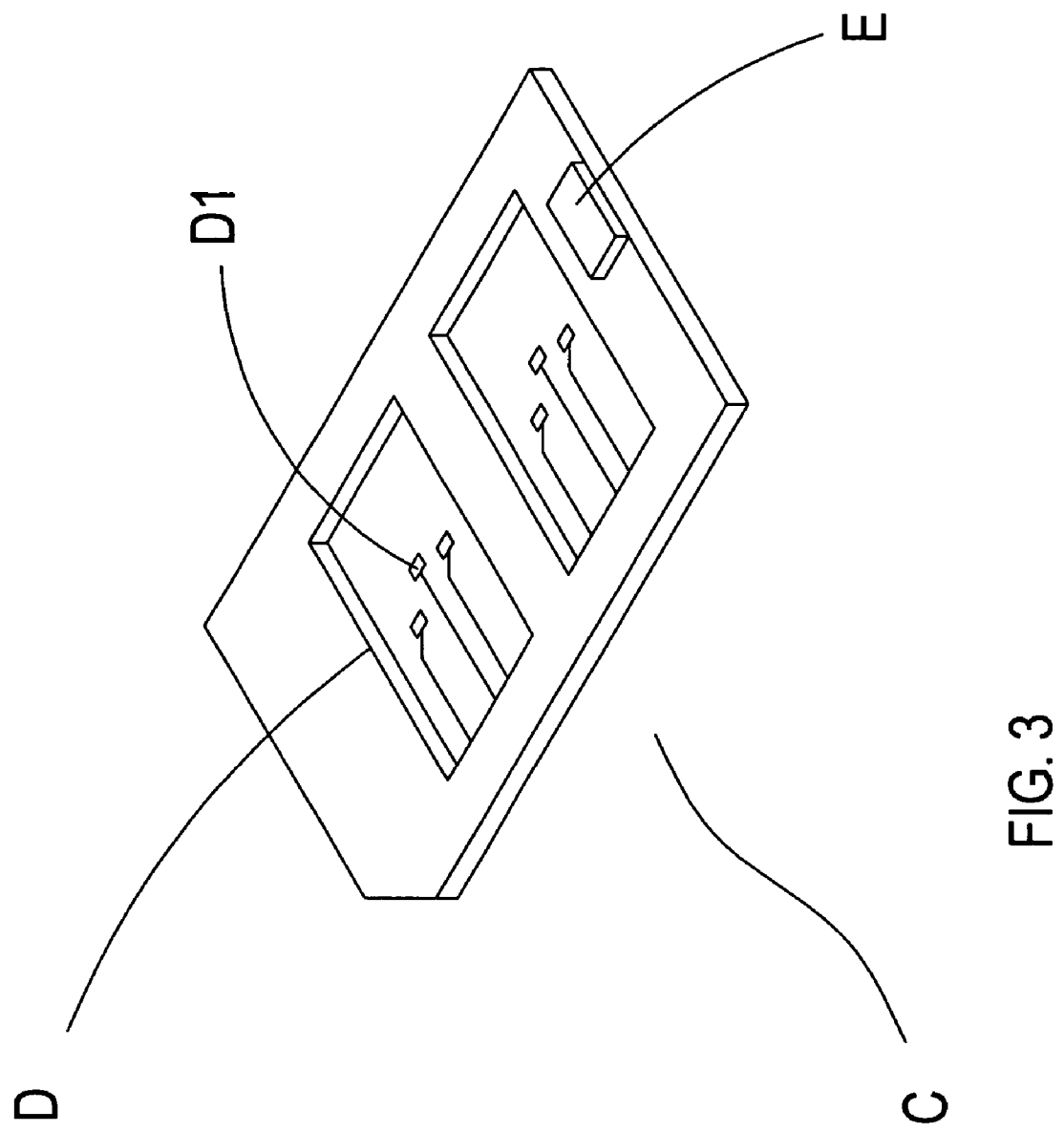
FIG. 3 shows a perspective view of the present invention.
Figure 4:
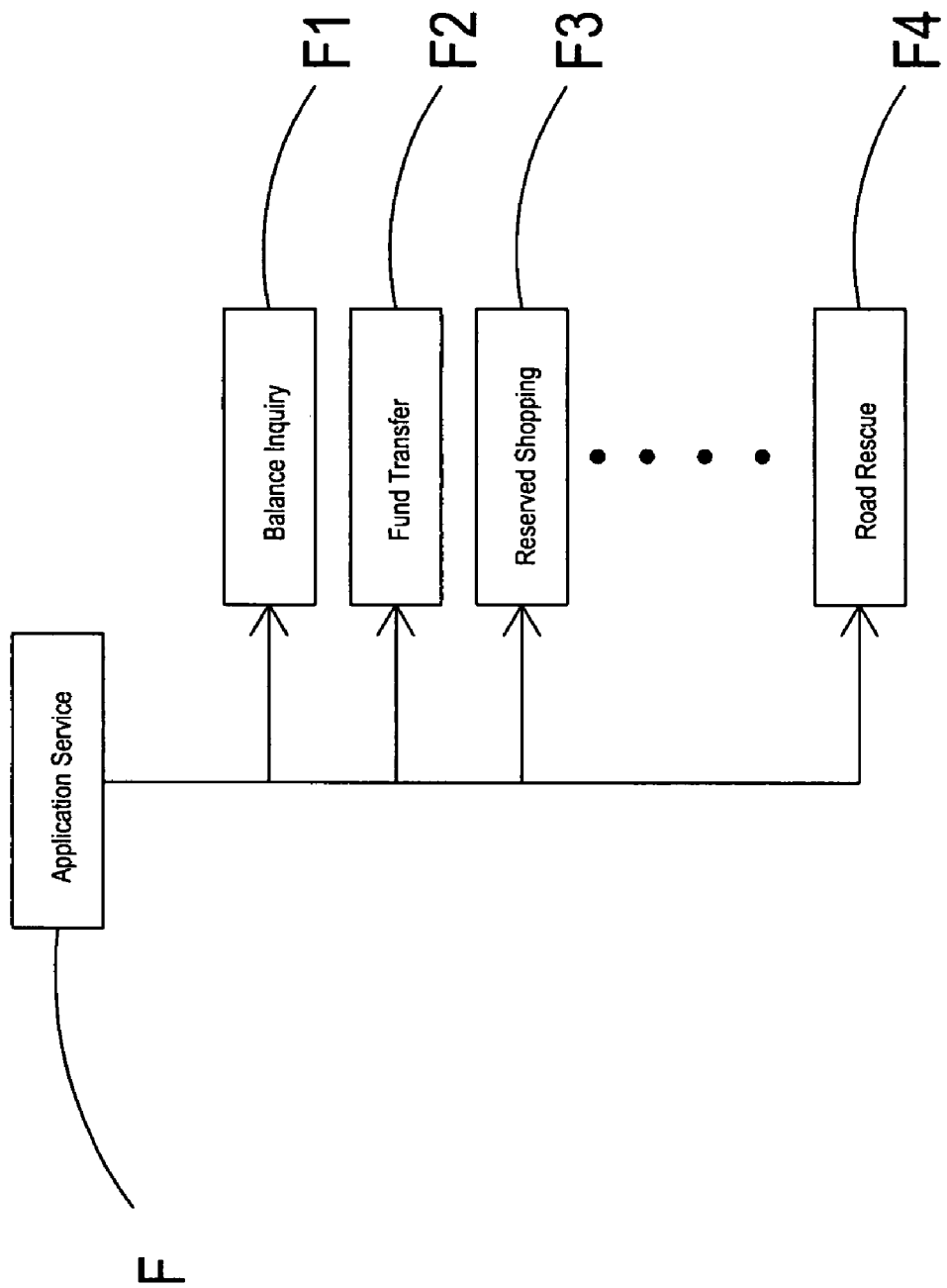
FIG. 4 shows a block diagram of the present invention.
Figure 5:
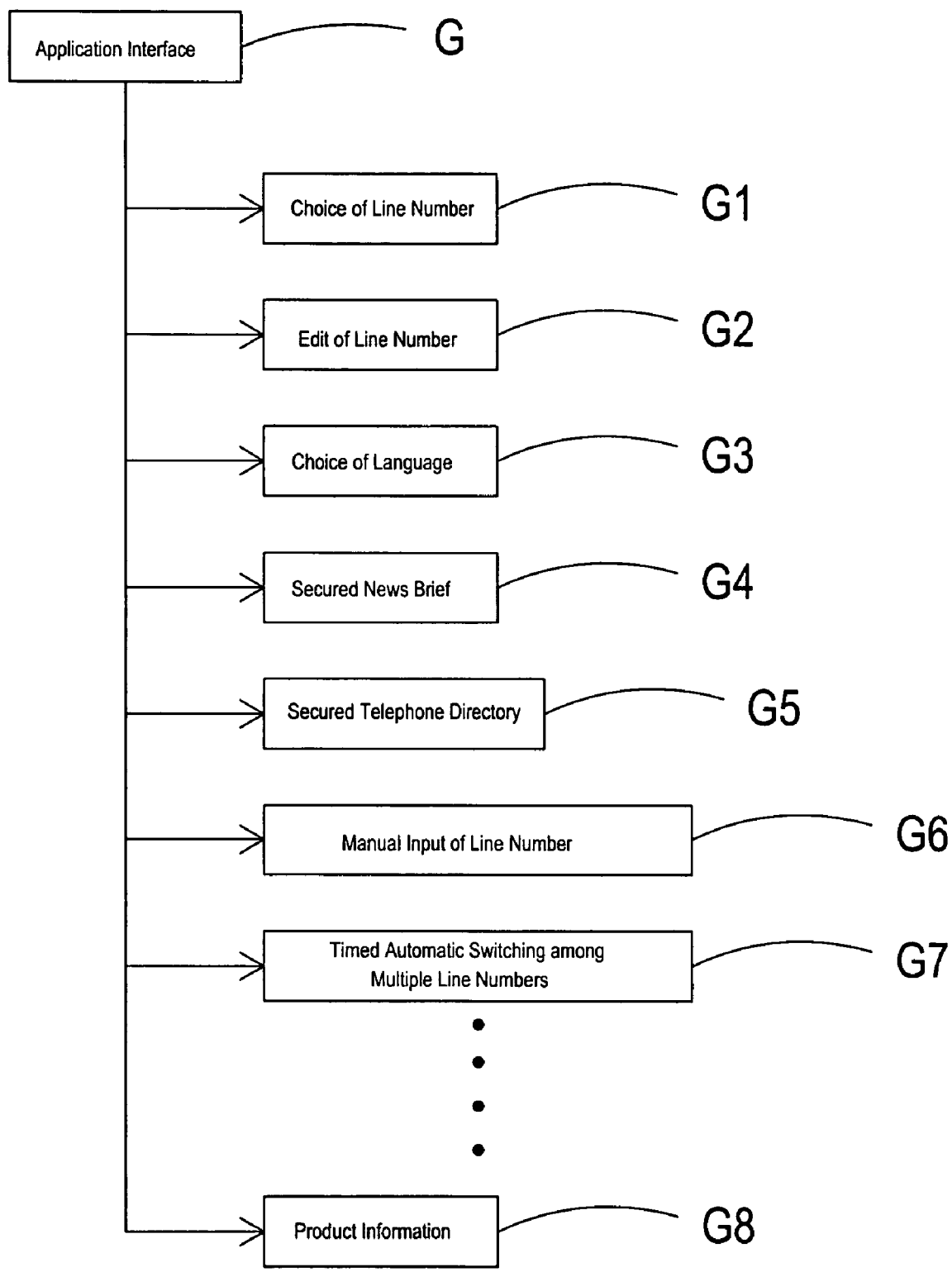
FIG. 5 shows another block diagram of the present invention.

Referring to FIGS. 3 to 5, a module C is primarily composed of one or more than one slots D and a control chip E, wherein the slots D are provided with a plurality of junctions D1 respectively, and the control chip E is electronically connected with the plural junctions D1 in the slots D.

To achieve an effect of expansion, the control chip E of present invention can be loaded with a balance inquiry F1, a fund transfer F2, a reserved shopping F3, a road rescue F4, and other related application services that a subscriber needs, for achieving a purpose of expansion.

To increase application functions, the control chip E of present invention is provided with a new application interface G which includes a choice of line number G1, an edit of line number G2, a choice of language G3, a secured news brief G4, a secured telephone directory G5, a manual input of line number information G6, a timed automatic switching among multiple line numbers G7, a product information G8, and other related application interfaces which can be operated, so as to achieve a purpose of enhancing the functions.

Referring to FIGS. 4 to 8, the module C is applied in a mobile communication device H, and the slot D of module C is used to emplace a subscriber identity card I. When the mobile communication device H is powered on, a subscriber can use an ordinary application service J of the subscriber identity card I itself, including an added-value service of entertainment J1, an on-line dating J2, a stock inquiry J3, and an added-value service of financial consultation J4, as well as an application service F and an application interface G provided by the control chip E. The application service F includes a balance inquiry F1, a fund transfer F2, a reserved shopping F3, a road rescue F4, and other related services that the subscriber needs; whereas the application interface G includes the choice of line number G1, the edit of line number G2, the choice of language G3, the secured news brief G4, the secured telephone directory G5, the manual input of line number information G6, the timed automatic switching among multiple line numbers G7, the product information G8, and other related application interfaces that can be operated.

Figure 6:
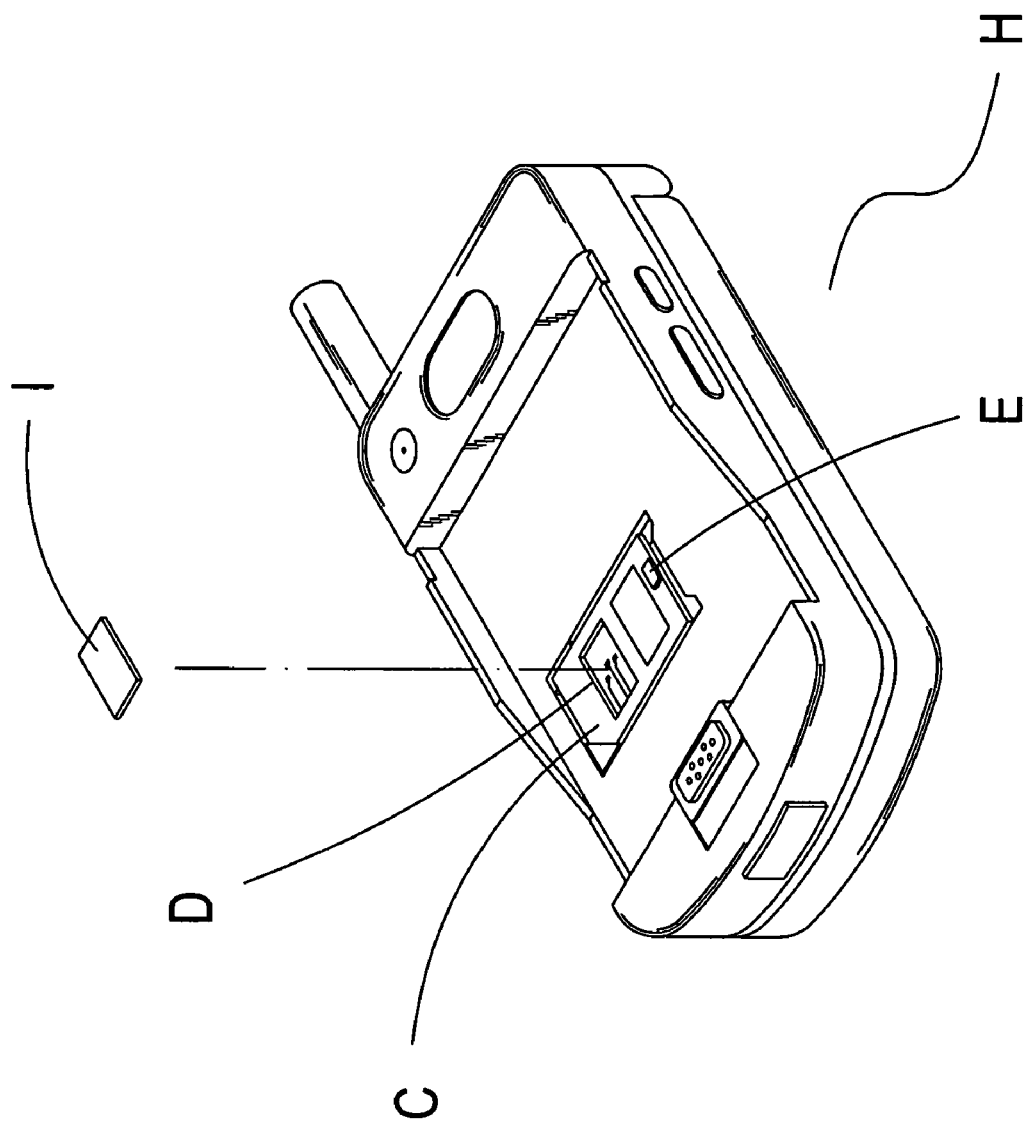
FIG. 6 shows a schematic view of an embodiment of the present invention.
Figure 9:
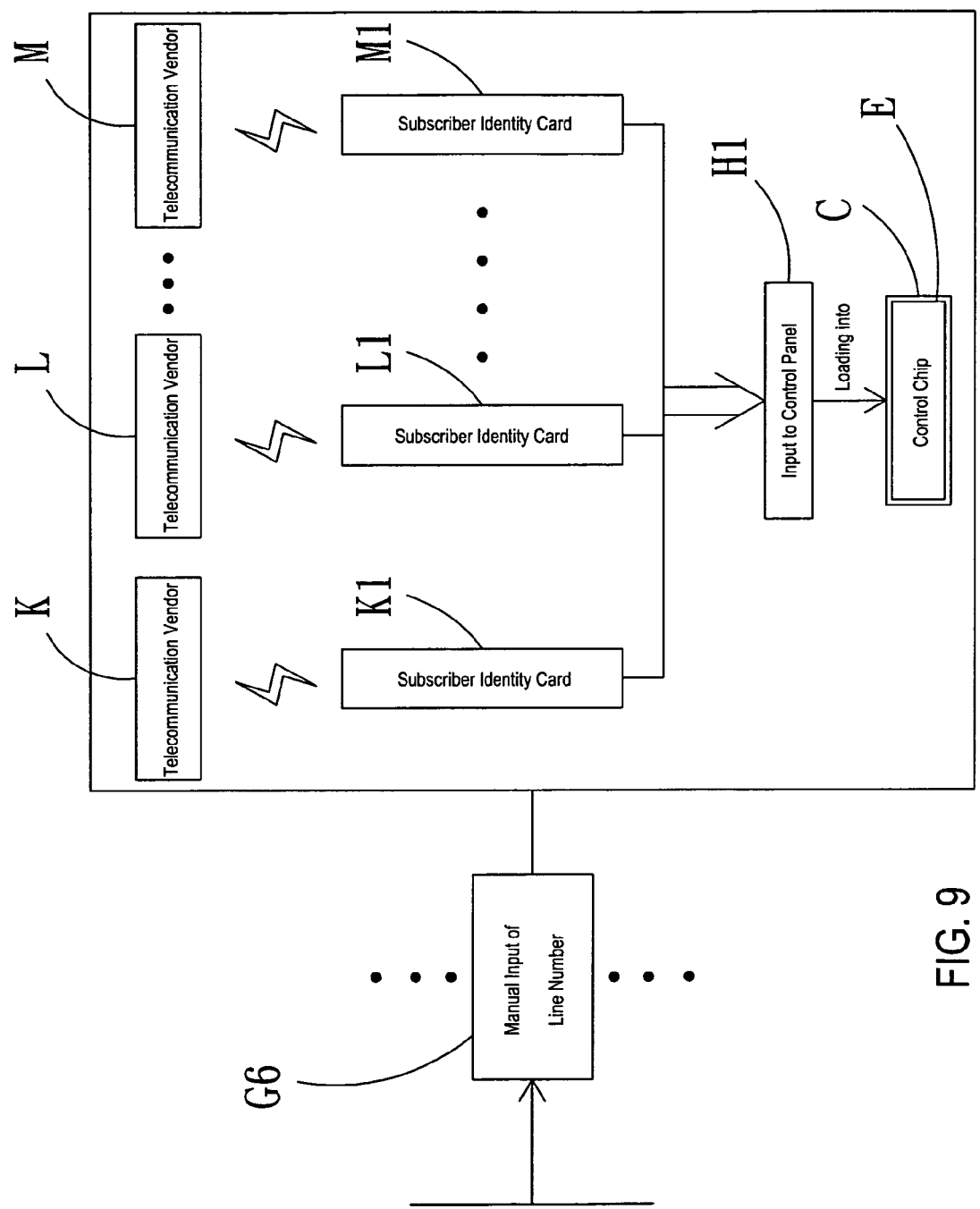
FIG. 9 shows a local flow diagram of the present invention.

Referring to FIG. 9, for the manual input of line number information G6, the subscriber can directly load an authentication serial number of each subscriber identify card K1, L1, M1 corresponding to each telecommunication line number K, L, M into the control chip E of module C, through an input to a control panel H1 of the mobile communication device H (as shown in FIG. 6), respectively, such that the mobile communication device H (as shown in FIG. 6) can be provided with a function of using multiple line numbers with one card.

Figure 7:
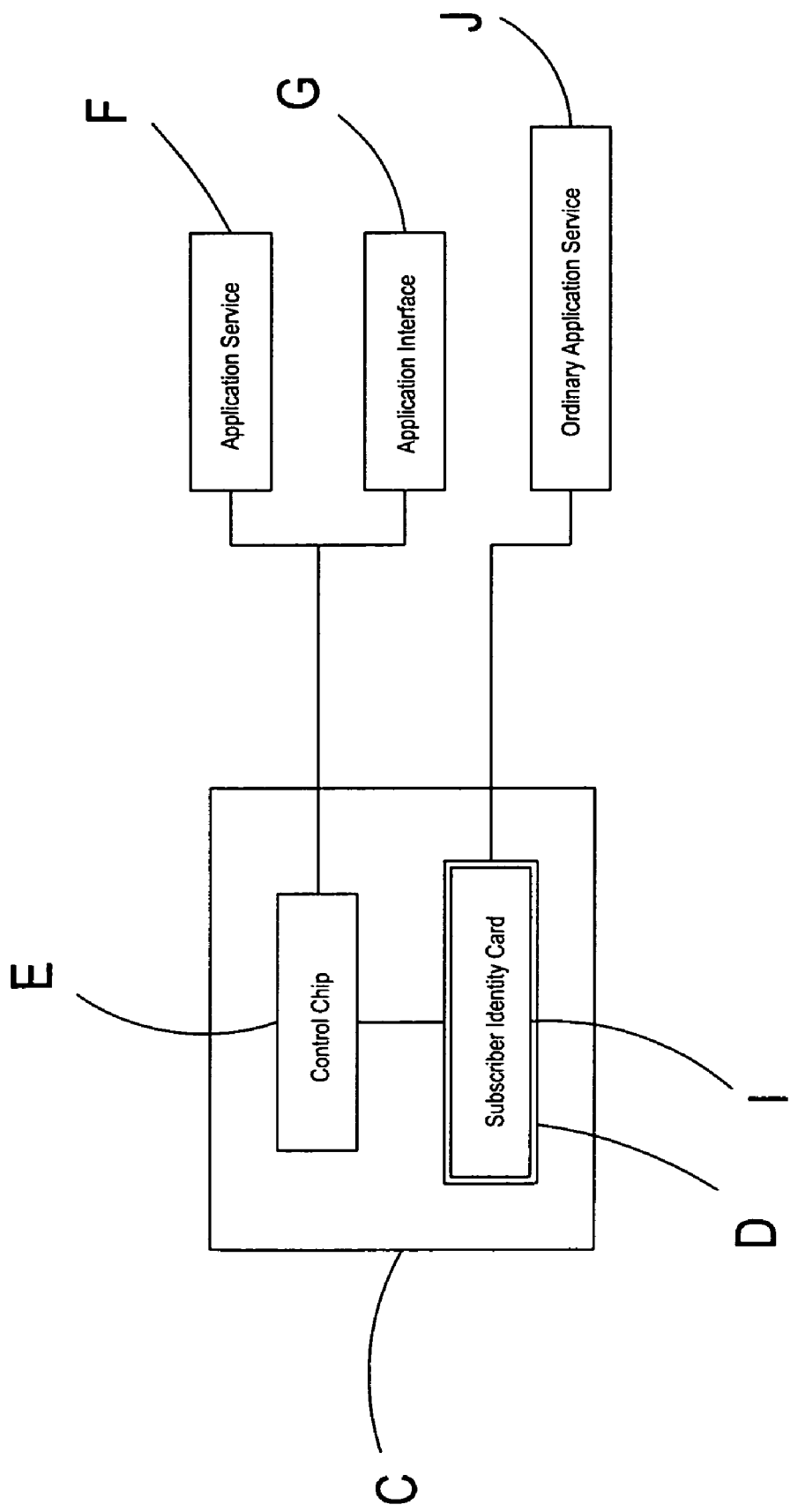
FIG. 7 shows a third block diagram of the present invention.
Figure 8:
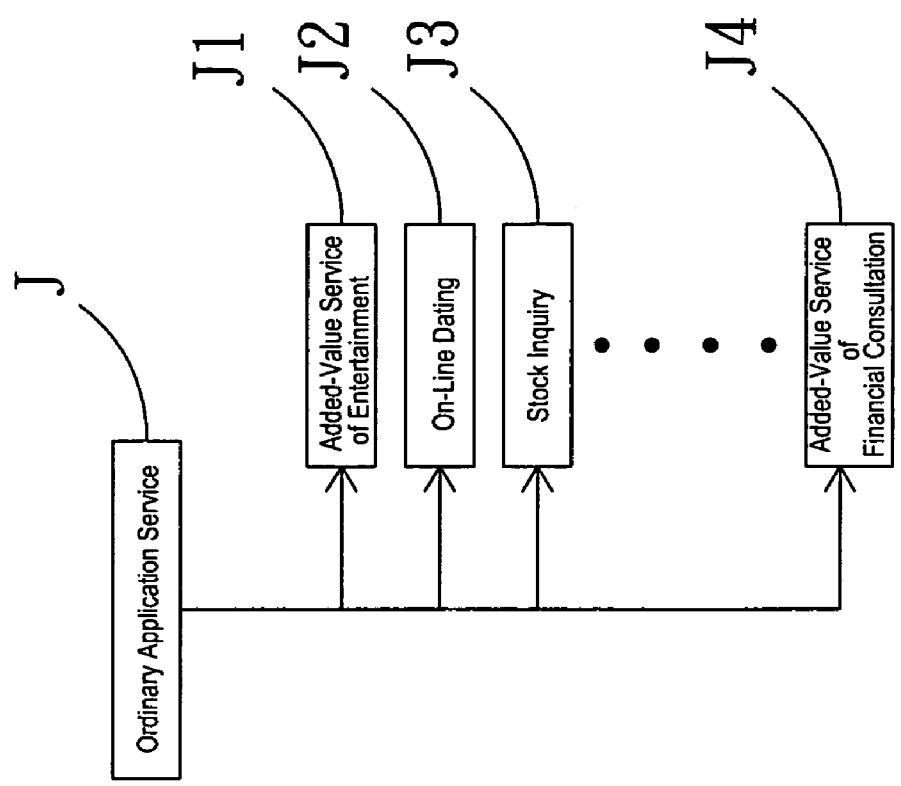
FIG. 8 shows a fourth block diagram of the present invention.

The control chip E can proceed with a change of functions of the application service F (as shown in FIG. 7) and the application interface G (as shown in FIG. 7) of the control chip E, through a wireless transmission, a wired transmission, an external loading device, and other related techniques for loading data, so as to facilitate the subscriber to choose preferred functions, thereby increasing the functions that can facilitate an operation of the subscriber.

To further manifest the advancement and practicability of the present invention, the advantages of present invention are listed below:
1. It is provided with an expansion function.
2. It can provide for a switching among multiple line numbers.
3. An edit, modification, and other related operations can be performed for different line numbers.
4. A new application interface can be additionally installed by using the control chip.
5. It is provided with an industrial competitiveness.
6. It is provided with a commercial value.
7. It is provided with uniqueness.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A module structure for expanding and enhancing functions of a SIM card being applied in a mobile communication device and comprising one or more than one slots which are provided with a plurality of junctions, respectively; the module being installed with a control chip which is electronically connected with the plural junctions in the slots, is provided with a new application interface, and can be loaded with an additional application service, so as to enable the module to achieve purposes of expanding and enhancing functions, wherein the application interface includes a choice of line number, an edit of line number, a choice of language, a secured news brief, a secured telephone directory, a manual input of line number information, a timed automatic switching among multiple line numbers, and a product information, so as to achieve a purpose of enhancing the functions.

2. The module structure for expanding and enhancing functions of a SIM card according to claim 1, wherein the control chip can proceed with a change of application service and application interface, through a wireless transmission, a wired transmission, and an external loading device.

3. The module structure for expanding and enhancing functions of a SIM card according to claim 1, wherein the mobile communication device includes a GSM (Global System for Mobile Communications), and a 3G communication system.

* * * * *